United States Patent [19]

Beaton

[11] Patent Number: 5,274,949
[45] Date of Patent: Jan. 4, 1994

[54] INSECT TRAP

[76] Inventor: Morris Beaton, 3214 N. Lakewood #3, Chicago, Ill. 60657-3216

[21] Appl. No.: 11,294

[22] Filed: Jan. 28, 1993

[51] Int. Cl.$^5$ .............................. H01M 1/04
[52] U.S. Cl. .......................... 43/113; 43/122
[58] Field of Search ............... 43/107, 122, 113, 118, 43/121, 114, 115

[56] References Cited

U.S. PATENT DOCUMENTS

| | | | |
|---|---|---|---|
| 1,005,530 | 10/1911 | Fritsch | 43/107 |
| 1,249,753 | 12/1917 | Higgins | 43/118 |
| 1,482,420 | 2/1924 | Wilson | 43/118 |
| 1,968,954 | 8/1934 | Metzger | 43/107 |
| 2,113,409 | 4/1938 | Niemeyer | 43/113 |
| 4,182,069 | 1/1980 | De Yoreo | 43/113 |
| 4,501,088 | 2/1985 | Boisvent et al. | 43/122 |
| 4,642,936 | 2/1987 | Jobin | 43/122 |

*Primary Examiner*—Richard K. Seidel
*Assistant Examiner*—James R. Miner
*Attorney, Agent, or Firm*—Robert E. Kleve

[57] ABSTRACT

The invention comprises a device for attracting and collecting flying insects. The device has an elongated clear plastic sleeve with a plurality of spaced passageways into the sleeve circumferentially around the sleeve to allow flying insects to travel therethrough into the interior of the sleeve. A fluorescent light is mounted centrally within the sleeve which can be illuminated to attract the flying insects toward the sleeve with the passageways in the sleeve allowing them to enter into the sleeve. A cone is mounted at the bottom of the sleeve having an enlarged upper end and a reduced lower end with downward converging tapered sides. A collection jar is detachably mounted to the lower end of the sleeve and surrounds the lower reduced end of the cone, whereby flying insects attracted into the sleeve, in circulating about in the sleeve, will be directed by the tapered sides of the cone through the reduced opening at the lower end of the cone into the jar where they will tend to remain captured within the jar. The jar is removable from the sleeve for emptying the jar of collected insects.

4 Claims, 1 Drawing Sheet

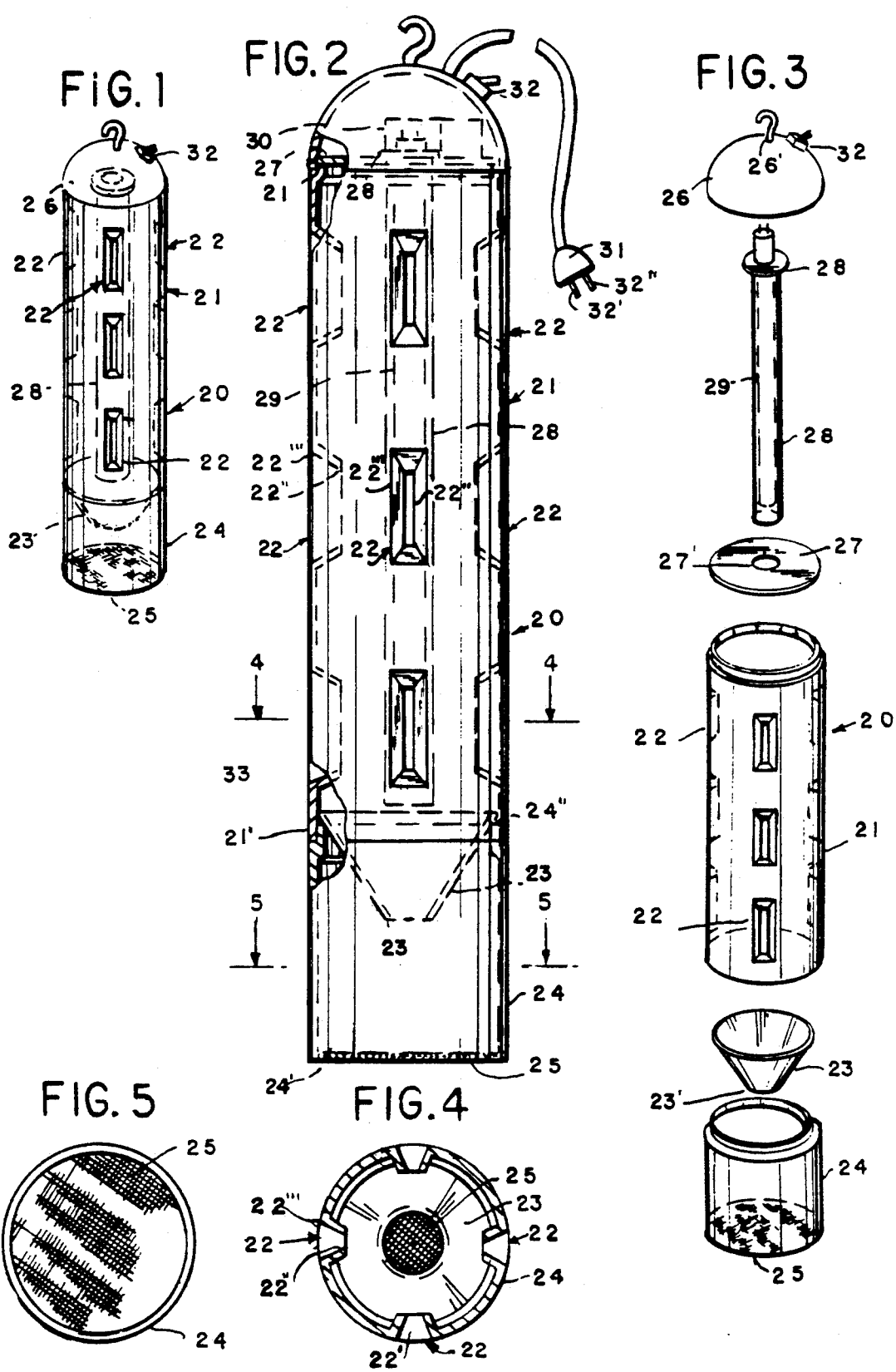

INSECT TRAP

BACKGROUND OF THE INVENTION

This invention relates to device for attracting and collecting flying insects and flying bugs and the like.

It is an object of the invention to provide a novel flying insect and flying bug attraction and collection device which has a novel clear, transparent sleeve with a series of passageways therethrough and a flourescent light within the sleeve to attract the insects and bugs toward the sleeve with the passageways allowing them to travel therethrough into the interior of the sleeve wiht a cone and collection jar at the bottom of the sleeve with the cone acting to direct the insects and bugs into the jar.

It is a further object of the invention to provide a novel transparent sleeve with illuminating means within the sleeve and with the sleeve having openings with tapered side to direct flying insects into the interior of the sleeve and with the illuminating means acting to attract flying insects toward the sleeve.

It is a further object of the invention to provide a novel attractive clear plastic sleeve illuminating means to attract and collect flying insects and the like.

Further objects and advantages of the invention will become apparent as the description proceeds and when taken in conjunction with the accompanying drawing wherein:

BRIEF DESCRIPTION OF THE DRAWING

FIG. 1 is a perspective view of the clear plastic sleeve like device with vents in the sleeve to allow flying insects and the like to travel into the sleeve with illuminating means in the sleeve for attracting and collecting flying insects and the like.

FIG. 2 is a side elevational view of the sleeve like insect and bug attracting and collecting device.

FIG. 3 is an exploded perspective view of the sleeve illuminating and collecting device for attracting and collecting flying insects and bugs.

FIG. 4 is a cross-sectional view taken along line 4—4 of FIG. 2.

FIG. 5 is a cross-sectional view taken along line 5—5 of FIG. 2.

BRIEF DESCRIPTION OF PREFERRED EMBODIMENT

Briefly stated, the invention comprises a bug and flying insect attraction and collection device having an elongated clear plastic cylindrical sleeve with a plurality of passageways into the sleeve from the exterior thereof to allow flying bugs and insects and the like to enter therethrough into the sleeve. A fluorescent light is is mounted within the sleeve, and the passageways have tapered sides tapering toward one another in a direction toward the center of the sleeve to direct the flying bugs an insects inward through the passageway into the interior of the sleeve. A cone like funnel is mounted to the bottom of the sleeve having its enlarged opening directed upward and its reduced opening directed downward. A collection jar is removably mounted to the bottom of the sleeve and surrounds the reduced lower opening in the funnel. The funnel tends to direct the flying bugs and insects once inside the sleeve downward through the reduced opening into the jar. The jar has an open bottom and a screen is mounted across to allow air to circulate into the jar from the bottom.

Referring more particularly to the drawing, in FIGS. 1 and 2 the flying bug and insect attraction and collection device 20 is illustrated having a cylindrical, clear plastic sleeve 21 with a plurality of passageway openings 22 into the clear sleeve from the exterior thereof. The edges 22' of the sleeve surrounding the openings taper inwardly, so that the inner end 22" of the opening is of reduced size with respect to the outer end 22" of the openings 22.

A cone like clear plastic funnel 23 is positioned at the bottom of the sleeve 21 and has its outer edge 23' supported on the top inner edge 24" of a collection jar 24. The collection jar 24, also made of clear plastic, is threaded along its outer upper edge into the inner lower threaded end 21' of the sleeve to threadably attach the jar 24 to the sleeve 21, with the upper edge of the funnel resting upon the upper inner edge 24" of the jar 24. The jar 24 has an open bottom 24'; and a screen 25 of relatively small mesh is fixed across the open bottom 24' to provide a screened closure to the bottom of the jar, while allowing air to circulate through the screen into the interior of the jar.

A spherical half cover 26 of clear plastic is threaded onto the top of the sleeve 21. The cover has a hook 26' threaded into its top to hook the device onto an elevated object to suspend the device from an elevated object. Cylindrical metal bands, not shown, may be clamped about the sleeve 21 with the ends attached to the wall as an alternatie structure for mounting the device 20 in a room. A clear plastic disc 27 has its outer edges resting on the top inner edge 21''' of the plastic sleeve and has an opening 27' in its center. A protective clear sleeve 28 has a annular flange 28', also of clear plastic, fixed to its top, which sleeve 28 extends through the opening 27' with the flange 28' resting on top of the disc 27. The sleeve 28 is located within the outer sleeve 21, and a fluorescent tube 29 extends downward through the opening 27' in the disc into the interior of the protective tube 28, and its fixed to the tube 29 at the top of the tube 29. A transformer 30 is also fixed to the top of the disc 27, and an electric switch 31 is mounted to the half spherical cover 26. An electric plug 32 has one prong 32' connected in series with the tube and the transformer, through switch 31, to the other prong 32" to serve as an electric circuit to provide electric current for illuuminating the flourescent tube 29, and to turn the tube 29 on and off in a conventional manner.

The device 20 may be supported indoors or outdoors on its hook and connected to a source of elctricity to energize the flourescent tube. The flourescent tube 29, when energized, will provide a relatively bright source of light to attract flying insects and the like. The light from the flourescent tube 29 passes through the clear plastic protective sleeve 28, and through the clear plastic outer sleeve 21 to provide a bright, illuminous object to attract flying insects and the like to the device 20. Also, the clear plastic of the sleeve 21, with the illumination, tends to diminish visual seeing of the outline of the vents or openings 22, and thereby makes it difficult for flying insects to see the outline of the openings 22. Consequently, once they have flown into the interior of the sleeve 21 through the openings 22 they tend to be trapped inside the sleeve 21. It is difficult, with the brightness of the light and the clear plastic material used in making the device, for the insect to possibly see the outline of the passages 22 and possibly escape from the sleeve by traveling through them, because of the effect of the light passing through the materials.

The bugs and other flying insects will be attracted by the light of the tube, and thus will tend to travel or flying toward the light and may fly through the openings 22 into the interior of the sleeve 21 in so doing. The flying insects, in circulating about the inside of the sleeve 21, will travel from time to time downward toward the cone or funnel 23. The downward reducing taper of cone or funnel 23 will thereupon tend to direct these flying insects downard into the funnel and through the bottom of the funnel into the jar 24.

Once the flying insects and bugs have traveled through the cone or funnel into the jar, the reduced size of the lower opening in the funnel or cone, and the outward and upward diverging outer surfaces of the funnel or cone tend not to direct the insects and bugs back upward and out through the opening 23" in the cone. Consequently, once they have traveled through the lower opening 23' in the cone, into the bottom of the jar, they tend to remained trapped in the jar and tend to ultimately die from lack of food in the jar or air.

Also, the outward taper of the openings 22, from the inside of the sleeve 21, tend to make it more diffucult for an insect to travel out through the openings 22, once inside the sleeve 21.

The device 20 provides, when illuminated, a novel illuminating device for attracting and capturing flying insects and bugs and the like. It also provides a novel, attractive appearance, and serves as a means of removing flying insects, bugs, and the like form an area adjacent the device. From time to time, the jar 24 may be unthreaded from the sleeve 21 to remove insects and bugs collected in the jar by being attracted into the device.

It will be obvious that various changes and departures may be made to the invention without departing from the spirit and scope thereof and accordingly, it is not intended that the invention be limited to that specifically described in the specification or as illustrated in the drawings, but only as set forth in the appended claims wherein:

What is claimed is:

1. An attraction and collection device for attracting and collecting flying insects comprising a vertically elongated, transparent, cylindrical sleeve having a plurality of passageways through said sleeve at horizontal and vertical intervals about said sleeve; a vertically elongated flourecent light mounted axially within said sleeve to illuminate radially outward through said sleeve to attract flying insects into said sleeve through said passageways; a cone shaped funnel adjacent the lower end of the sleeve having an enlarged upper end forming an opening with the enlarged upper end within the bottom of the sleeve; a collection jar having an upper opening with an upper end removably mounted to the bottom of the sleeve; said funnel having a reduced lower end forming a reduced lower end opening with said reduced lower end projecting downward into said jar; said cone's enlarged upper end opening communicating with the interior of the sleeve from the bottom of the sleeve; said cone's reduced lower end opening communicating with the interior of the jar; said light having its illumination in the sleeve in the area of the passageways into the sleeve and said passageways having transparent tapered sides converging inward toward one another to form narrower openings into the interior of the sleeve at the inner edges of the tapered sides than the outer edges of the tapered sides, whereby the illumination of the light may attract insects toward the sleeve and toward the openings into the sleeve and may be directed by the tapered sides into the narrower openings into the sleeve with the tapered sides making it more difficult for the insects to leave the sleeve through the reduced openings than to enter and thereby tend to keep the insects captured within the jar.

2. A device according to claim 1 wherein said jar has an opening along its bottom with a mesh screen mounted accros the opening to enable air to circulate into the jar while retaining the insects in the jar.

3. An attraction and collection device for attracting and collecting flying insects comprising a vertically elongated, transparent, cylindrical sleeve having a plurality of passageways forming openings through the sleeve at horizontal and vertical intervals about the sleeve, a vertically elongated flourescent light mounted axially within the sleeve and extending along at least a majority of length of the sleeve and along that portion of the length of the sleeve having passageways; a cone shaped funnel adjacent the lower end of the sleeve having an enlarged upper end forming an enlarged upper opening positioned within the lower end of the sleeve and communicating with the interior of the sleeve; a collection jar havin an upper opening with an upper end of the jar removably mounted to the bottom of said sleeve, said funnel having a reduced lower end forming a reduced lower end opening with said lower end projecting downward into said jar and said lower opening communicating with the interior of the jar and thereby providing communication from the sleeve to the jar; said light providing illumination in the sleeve in the area of the passagewass into the sleeve and tending to make it difficult to see the outline of the edges of the passagewas into the transparent sleeve, whereby the illumination of the light will illuminate the sleeve and attract insects toward the sleeve and toward openings into the sleeve, and with the illumination making it more difficult to see the outline of the passageways so that once the insect passes through the passageways into the sleeve the insects will have difficulty in seeing the passageways to leave the sleeve and will thereby tend to stay captured within the sleeve.

4. An attraction and collection device according to claim 3 wherein said passageways have tapered sides along the openings into the sleeve converging inward and toward one another to form a reduced opening with respect to an outer opening radially inward from the sleeve and tending to funnel insects into the sleeve.

* * * * *